United States Patent
Grimm et al.

(10) Patent No.: US 10,007,584 B2
(45) Date of Patent: Jun. 26, 2018

(54) AUTOMATED CONTAINER MIGRATION IN A PLATFORM-AS-A-SERVICE SYSTEM

(71) Applicant: Red Hat, Inc., Raleigh, NC (US)

(72) Inventors: Andrew Grimm, Durham, NC (US); Michael McGrath, Schaumburg, IL (US); Kenneth Woodson, Fuquay Varina, NC (US)

(73) Assignee: Red Hat, Inc., Raleigh, NC (US)

( * ) Notice: Subject to any disclaimer, the term of this patent is extended or adjusted under 35 U.S.C. 154(b) by 319 days.

(21) Appl. No.: 14/607,478

(22) Filed: Jan. 28, 2015

(65) Prior Publication Data

US 2016/0217050 A1    Jul. 28, 2016

(51) Int. Cl.
     *G06F 11/20*      (2006.01)
     *G06F 11/00*      (2006.01)

(52) U.S. Cl.
CPC ............ *G06F 11/203* (2013.01); *G06F 11/00* (2013.01); *G06F 2201/805* (2013.01)

(58) Field of Classification Search
CPC .................. G06F 9/505; G06F 9/5077; G06F 2009/4557; G06F 2209/503; G06F 9/5083; G06F 9/5088
See application file for complete search history.

(56) References Cited

U.S. PATENT DOCUMENTS

| | | |
|---|---|---|
| 7,401,256 B2 | 7/2008 | Ishida |
| 8,656,406 B2 | 2/2014 | Nakayama et al. |
| 8,671,189 B2 | 3/2014 | Cho et al. |
| 2010/0211956 A1* | 8/2010 | Gopisetty ............. G06F 9/5088 718/104 |

(Continued)

FOREIGN PATENT DOCUMENTS

CN      102821000 A      12/2012

OTHER PUBLICATIONS

Zikos, Marios, "Microsoft Azure Load Balancing Services", http://azure.microsoft.com/blog/2014/04/08/microsoft-azure-load-balancing-services/, Apr. 8, 2014, 9 pages.

(Continued)

*Primary Examiner* — Bryce P Bonzo
*Assistant Examiner* — Jeison C Arcos
(74) *Attorney, Agent, or Firm* — Lowenstein Sandler LLP

(57) ABSTRACT

Implementations provide for automated container migration in a Platform-as-a-Service (PaaS) system. A method of the disclosure includes receiving, by a processing device executing a control server of a multi-tenant Platform-as-a-Service (PaaS) system, identification of a distressed node of the multi-tenant PaaS system and a resource under contention at the distressed node, providing, by the control server, identification of the resource under contention to the distressed node, receiving, by the control server, identification of a candidate container executing on the distressed node, wherein the candidate container contributes to the resource under contention on the distressed node and is launched from an instance of an application image corresponding to an application of the PaaS system, and sending, by the control server, the identification of the candidate container to a PaaS master component of the PaaS system and a request to migrate the candidate container from the distressed node.

20 Claims, 6 Drawing Sheets

(56) References Cited

U.S. PATENT DOCUMENTS

| | | | | |
|---|---|---|---|---|
| 2011/0161957 A1* | 6/2011 | Bernardi | ............... | G06F 9/4445 |
| | | | | 718/1 |
| 2011/0277026 A1* | 11/2011 | Agarwal | ................ | G06F 21/41 |
| | | | | 726/8 |
| 2011/0277027 A1* | 11/2011 | Hayton | ............... | H04L 63/0815 |
| | | | | 726/8 |
| 2011/0307889 A1* | 12/2011 | Moriki | ................ | G06F 9/45558 |
| | | | | 718/1 |
| 2012/0151061 A1* | 6/2012 | Bartfai-Walcott | .... | G06F 9/4856 |
| | | | | 709/226 |
| 2012/0281708 A1* | 11/2012 | Chauhan | ............. | H04L 63/0272 |
| | | | | 370/401 |
| 2012/0297238 A1* | 11/2012 | Watson | ............... | G06F 11/3442 |
| | | | | 714/4.11 |
| 2013/0179881 A1 | 7/2013 | Calder et al. | | |
| 2013/0227560 A1* | 8/2013 | McGrath | ............. | G06F 9/45558 |
| | | | | 718/1 |
| 2014/0068611 A1 | 3/2014 | McGrath et al. | | |
| 2014/0108665 A1* | 4/2014 | Arora | .................... | H04L 67/141 |
| | | | | 709/227 |
| 2014/0149784 A1 | 5/2014 | Ngo et al. | | |
| 2014/0196044 A1 | 7/2014 | Fernando | | |
| 2015/0222702 A1* | 8/2015 | Salle | ..................... | G06F 9/4856 |
| | | | | 709/201 |

OTHER PUBLICATIONS

Sullivan, Dan, "PaaS Provider Comparison Guide: Amazon AWS as a PaaS", http://www.tomsitpro.com/articles/amazon-aws-paas-iaas-cloud-computing,2-608-3.html, Sep. 10, 2013, 3 pages.

Karthika, S. et al, "Load Balancing and Maintaining the Qos on Cloud Partitioning for the Public Cloud", http://ijircce.com/upload/2014/february/4_Load.pdf, Feb. 2014, 6 pages.

* cited by examiner

AUTOMATED CONTAINER MIGRATION IN A PLATFORM-AS-A-SERVICE SYSTEM

TECHNICAL FIELD

The implementations of the disclosure relate generally to Platform-as-a-Service (PaaS) systems and, more specifically, relate to automated container migration in a PaaS system.

BACKGROUND

A variety of Platform-as-a-Service (PaaS) system offerings exists that include software and/or hardware facilities for facilitating the execution of web applications in a cloud-computing environment (the "cloud"). Cloud computing is a computing paradigm in which a customer pays a "cloud provider" to execute a program on computer hardware owned and/or controlled by the cloud provider. It is common for cloud providers to make virtual machines (VMs) hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings facilitate deployment of web applications without the cost and complexity of buying and managing the underlying hardware and software and provisioning hosting capabilities, providing the facilities to support the complete life cycle of building and delivering web applications and services entirely available from the Internet. Typically, these facilities operate as one or more VMs running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the disclosure provide automated container migration in a Platform-as-a-Service (PaaS) system. Implementations provide a solution to monitor resource usage on nodes of the multi-tenant PaaS system, detect which application component(s) executed on a node are causing performance problems, and move one or more application components off of the node to address the resource usage issue. As a result, resource usage is balanced across the PaaS system. A monitoring server is provided in the PaaS system to monitor and diagnose nodes when they achieve a certain amount of resource usage. Monitored resources may include CPU utilization, memory utilization, block input/output (I/O) utilization, network bandwidth utilization, and so on. Monitoring server communicates with monitoring agents located on each node, a control server, and a PaaS master component in order to coordinate the resource monitoring, contention detection, and application component migration between nodes.

Previous solutions for addressing resource contention in a PaaS system would utilize manual intervention to identify problematic application components and cause those application components to be stopped on one node and started on another node. Implementations of the disclosure provide for a minimally-invasive and automated resource contention monitoring and balancing solution for a multi-tenant PaaS. Specifically, implementations of the disclosure utilize high-level resource usage monitoring to identify contention issues and then provide pinpointed analysis when a high-level resource contention issue is discovered. In addition, implementations of the disclosure utilize an automated migration process to balance resource usage among the components (e.g., nodes) in the multi-tenant PaaS.

Figure 1:
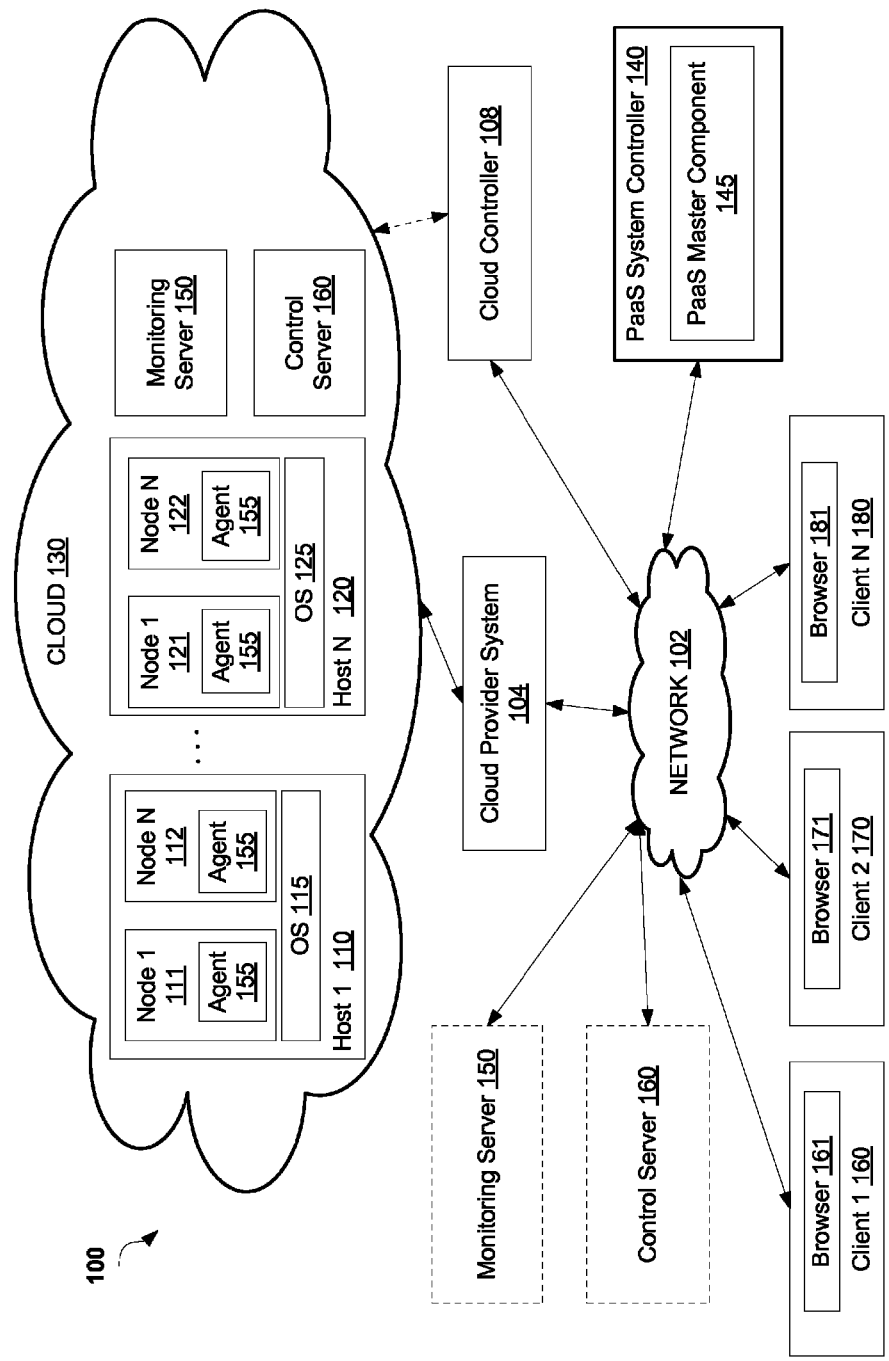
FIG. 1 is a block diagram of a network architecture in which implementations of the disclosure may operate.

FIG. 1 is a block diagram of a network architecture 100 in which implementations of the disclosure may operate. The network architecture 100 includes a cloud 130 managed by a cloud provider system 104. The cloud provider system 104 provides nodes 111, 112, 121, 122 to execute software and/or other processes. In some implementations these nodes are virtual machines (VMs) that are hosted on a physical machine, such as host 1 110 through host N 120, configured as part of the cloud 130. In some implementations, the host machines 110, 120 are often located in a data center. For example, nodes 111 and 112 are hosted on physical machine 110 in cloud 130 provided by cloud provider 104. When nodes 111, 112, 121, 122 are implemented as VMs, they may be executed by OSes 115, 125 on each host machine 110, 120.

In some implementations, the host machines 110, 120 are often located in a data center. Users can interact with applications executing on the cloud-based nodes 111, 112, 121, 122 using client computer systems, such as clients 160, 170 and 180, via corresponding web browser applications 161, 171 and 181. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. Based on these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each VM 111, 112, 121, 122. This data may be used for the execution of applications for a multi-tenant PaaS system managed by the PaaS provider controller 140.

In one implementation, the data used for execution of applications includes application images built from pre-existing application components and source code of users managing the application. As discussed above, an image refers to data representing executables and files of the application used to deploy functionality for a runtime instance of the application. In one implementation, the image is built using a Docker tool and is referred to as a Docker image. An application image may be built in the PaaS system using an image build system (not shown) of the PaaS system. The image build system 130 may be provided on components hosted by cloud 130, on a server device external to the cloud 130, or even run on nodes 111, 112, 121, 122 (not shown). The image build system generates an application image for an application by combining pre-existing ready-to-run application image corresponding to core functional components of the application (e.g., a web framework, database, etc.) with source code specific to the application provided by the user. The resulting application image may be pushed to image repository 106 for subsequent use in launching instances of the application images for execution in the PaaS system.

Upon receiving a command identifying specific data (e.g., application data and files, such as application images, used to initialize an application on the cloud) from the PaaS provider controller 140, the cloud provider 104 retrieves the corresponding data from the image repository 106, creates an instance of it, and loads it to the host 110, 120 for execution by nodes 111, 112, 121, 122. In addition, a command may identify specific data to be executed on one or more of the nodes 111, 112, 121, and 122. The command may be received from the cloud controller 108, from the PaaS system controller 140, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based discs, solid-state-drives (SSDs) or hard drives.

In one implementation, the PaaS system provide a solution to monitor resource usage on nodes 111, 112, 121, 122, detect when which application component(s) executed on the node are causing performance problems, and move one or more application components off of the node 111, 112, 121, 122 to address the resource usage issue on the node 111, 112, 121, 122. As a result, resource usage is balanced across the PaaS system. A monitoring server 150 is provided in the PaaS system to monitor and diagnose nodes 111, 112, 121, 122 when they achieve a certain amount of resource usage. Monitored resources may include CPU utilization, memory utilization, block input/output (I/O) utilization, network bandwidth utilization, and so on. Monitoring server 150 communicates with monitoring agents 155 located on each node 111, 112, 121, 122, a control server 160, and a PaaS master component 145 in order to coordinate the resource monitoring, contention detection, and application component migration between nodes as discussed in more detail further below with respect to FIG. 2 through 5.

While various implementations are described in terms of the environment described above, those skilled in the art will appreciate that the facility may be implemented in a variety of other environments including a single, monolithic computer system, as well as various other combinations of computer systems or similar devices connected in various ways. For example, the monitoring server 150 and/or the controller server 160 may be running on a node of the PaaS system hosted by cloud 130, or may execute external to cloud 130 on a separate server device. In another example, the data from the image repository 106 may run directly on a physical host 110, 120 instead of being instantiated on nodes 111, 112, 121, 122. In some implementations, an environment other than a VM may be used to execute functionality of PaaS applications. As such, in some implementations, a "node" providing computing functionality may provide the execution environment for an application of the PaaS system. The "node" may refer to a VM or any other type of computing environment.

Figure 2:
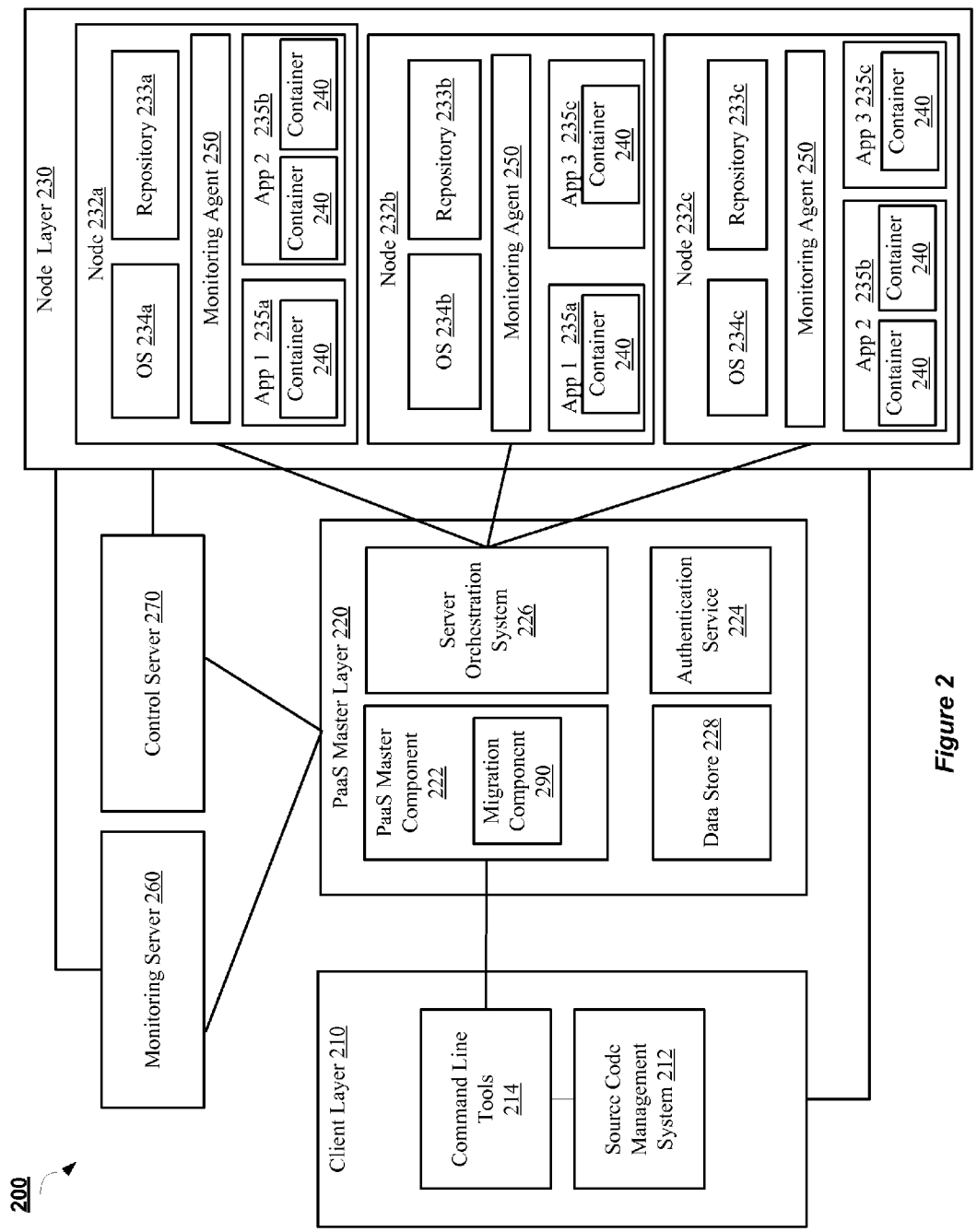
FIG. 2 is a block diagram of a multi-tenant Platform-as-a-Service (PaaS) system architecture according to an implementation of the disclosure.

FIG. 2 is a block diagram of a multi-tenant PaaS system architecture 200 according to an implementation of the disclosure. The PaaS architecture 200 allows users to launch software applications in a cloud computing environment, such as cloud computing environment provided in network architecture 100 described with respect to FIG. 1. The PaaS system architecture 200, in one implementation, includes a client layer 210, a PaaS master layer 220, and a node layer 230.

In one implementation, the components of the PaaS system architecture are in communication with each other via a network (not shown). The network may include, for example, the Internet in one implementation. In other implementations, other networks, wired and wireless, such as an intranet, local area network (LAN), wide area network (WAN), or broadcast network may be used.

In one implementation, the client layer 210 resides on a client machine, such as a workstation of a software developer, and provides an interface to a user of the client machine to the PaaS master layer 220 of the PaaS system 200. In one implementation, the client machine can be a client 160, 170, 180 described with respect to FIG. 1. The PaaS master layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Another example of an SCM or revision control system is Mercurial, also available as open source software. Git, Mercurial, and other such distributed SCM systems typically include a working directory for making changes, and a local software repository for storing the changes for each application associated with the end user of the PaaS system 200. The packaged software application can then be "pushed" from the local SCM repository to a remote SCM repository, such as repositories 233a, 233b, 233c, at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one implementation, also includes a set of command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 expose an application programming interface ("API") of the PaaS master layer 220 and perform other applications management tasks in an automated fashion using other interfaces, as will be described in more detail further below in accordance with some implementations.

In one implementation, the PaaS master layer 220 acts as middleware between the client layer 210 and the node layer 230. The node layer 230 includes the nodes 232a-c on which applications 235a-c are provisioned and executed. In one implementation, each node 232a-c is a VM. In some implementations, the VMs are provisioned by an Infrastructure as a Service (IaaS) provider. In other implementations, the nodes 232a-c may be physical machines or VMs residing on a single physical machine. In one implementation, the PaaS master layer 220 is implemented on one or more machines, such as server computers, desktop computers, etc. In some implementations, the PaaS master layer 220 may be implemented on one or more machines separate from machines implementing each of the client layer 210 and the node layer 230, or may be implemented together with the client layer 210 and/or the node layer 230 on one or more machines, or some combination of the above.

In one implementation, the PaaS master layer 220 includes a PaaS master component 222 that coordinates requests from the client layer 210 with actions to be performed at the node layer 230. Examples of the requests can include a request to create an application, a request to perform an action on a container (e.g., creating, removing, and/or managing a container), a request to deploy source code of an application, a request to designate a system to host a remote SCM repository (e.g., an indication that a system has been designated by a user to host a remote SCM repository), etc.

In one implementation, a user, using the command line tools 214 at client layer 210, can request the creation of a new application 235a-c, deployment of source code of the application 235a-c, the designation of a system that hosts a remote SCM repository, etc. In response to receiving such a request, the PaaS master component 222 may first authenticate the user using an authentication service 224. In one implementation, the authentication service 224 may comprise custom authentication methods, or standard protocols such as SAML, Oauth, etc. Once the user has been authenticated and allowed access to the system by authentication service 224, the PaaS master component 222 uses a server orchestration system 226 to collect information and configuration information about the nodes 232a-c.

In one implementation, the PaaS master component 222 uses the ETCD™ service available from CoreOS™ as the server orchestration system 226, but other server orchestration systems may also be used. The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the PaaS master component 222 manages the business logic and model representing the nodes 232a-c and the applications 235a-c residing on the nodes, and acts as a controller that generates the actions requested by users via an API of the command line tools 214. The server orchestration system 226 then takes the actions generated by the PaaS master component 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud-based storage service provided by a Software-as-a-Service (SaaS) provider. The PaaS master component 222 uses the information about the nodes 232a-c and their applications 235a-c to model the application hosting service and to maintain records about the nodes. In one implementation, data of a node 232a-c is stored in the form of a JavaScript™ Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-c that may be owned or managed by different users and/or organizations. As such, a first customer's deployed applications 235a-c may co-exist with any other customer's deployed applications on the same node 232 that is hosting the first customer's deployed applications 235a-c. In some implementations, portions of an application execute on multiple different nodes 232a-c. For example, as shown in FIG. 2, components of application 1 235a run in both node 232a and node 232b. Similarly, components of application 2 235b may run in node 232b and node 232c.

In one implementation, each node 232a-c is implemented as a VM and has an operating system 234a-c that can execute applications 235a-c using the repositories 233a-c that are resident on the nodes 232a-c. Each node 232a-c also includes a server orchestration system agent (not shown) configured to track and collect information about the node 232a-c and to perform management actions on the node 232a-c. The server orchestration system agent may operate in tandem with the server orchestration system 226 to send requests, queries, and commands between the node 232a-c and the PaaS master layer 220.

As discussed above, node 232a-c runs multiple applications 235a-c. A node 232a-c runs an application by launching an instance of an application image as a container 240 in the node 232a-c. An application images include the underlying support software that implements the functionality of applications 235a-c. An application image for an application may be built at build system (not shown), which may be separate from or part of node layer 230. The build system may generate an application image from a combination of pre-existing ready-to-run application images related to core functionality of the application and source code provided by a user of the application.

For example, the pre-existing ready-to-run application images may include support software providing functionality (e.g., configuration templates, scripts, dependencies, etc.) used to run the application 235a-c and/or add a feature to the application 235a-c. For example, the images may support languages such as, but not limited to, Java™ PHP, Ruby, Python, Perl, and so on. In addition, application images may be generated that support databases, such as MySQL™, PostgreSQL™, Mongo™, and others. Pre-existing ready-to-run application images may also include those that support the build and continuous integration environments, such as a Jenkins-based image. Lastly, pre-existing ready-to-run application images may be used to support management capabilities and/or tools, such as PHPmyadmin, RockMongo™, 10gen-mms-agent, cron scheduler, and HAProxy, Maven, and Gradle, for example.

Each application image built at build system may map to a functional component of the application 235a-c. As such, an application may have more than one application image associated with the application. Built application images may be pushed to image repository for storage and accessibility for subsequent use in launching instances of the application images at containers 240 in nodes 232a-c.

A container 240 is a resource-constrained process space on the node 232a-c to execute functionality of an application 235a-c. In some implementations, a container 240 is established by the node 232a-c with resource boundaries, including a limit and/or designation of the amount of memory, amount of storage, and security types and/or labels to be applied to any functions executed by the container 240. In one implementation, containers 240 may be established using the Linux Containers (LXC) method. In further implementations, containers 240 may also be established using cgroups, SELinux™, and kernel namespaces, to name a few examples.

Application image instances for an application 235a-c may be launched in containers 240 dispersed over more than one node 232a-b. In other implementations, application images instances for an application 235a-c may run in one or more containers 240 on the same node 232a-c. Furthermore, an application 235a-c may use more than one application image 240 as part of providing functionality for the application 235a-c. One example of this is a JavaEE™ application that uses a JBoss™ application server-based application image with a supporting MySQL™ database provided by a MySQL™-based application image.

In one implementation, the PaaS system 200 provide a solution to monitor resource usage on nodes 232a-c, detect when container 240 executed on the node 232a-c are causing performance problems, and move one or more containers 240 between nodes 232a-c to address the resource usage issue on the distressed node 232a-c. As a result, resource usage is balanced across the PaaS system 200. A monitoring server 260 is provided in the PaaS system to monitor and diagnose nodes 232a-c when they achieve a certain amount of resource usage. In one implementation, monitoring server 260 is the same as monitoring server 150 described with respect to FIG. 1. Monitored resources may include CPU utilization, memory utilization, block input/output (I/O) utilization, network bandwidth utilization, and so on.

Monitoring server 260 may communicate with monitoring agents 250 located on each node 232a-c to acquire status reports on resource usage by the node. In one implementation, monitoring agents 250 may be the same as monitoring agents 155 described with respect to FIG. 1. Monitoring server 260 may configure monitoring agents 150 to report back to monitoring server 260 resource usage levels at the node 232a-c at predetermined intervals. In some implementations, monitoring agent 250 may be configured to report different resource usage levels at different time intervals. When monitoring server 260 receives resource usage level status reports from the monitoring agent, monitoring server 260 analyzes the resource usage levels to determine whether they exceed configured threshold levels of the resource usage. When the monitoring server 260 determines that a resource usage level exceeds a threshold for that resource, the monitoring server 260 informs a control server 270 of a resource contention problem occurring on the distressed node 232a-c.

In one implementation, control server 270 is the same as control server 160 described with respect to FIG. 1. The control server 270 is a component capable of accessing all other nodes 232a-c running in the PaaS system and executing commands against those nodes 232a-c. The control server 270 receives information regarding a distressed node 232a-c in resource contention, the control server queries the identified distressed node 232a-c to query for one or more containers 240 that are candidates for migration from the node 232a-c.

In one implementation, the control server 270 sends the name of the resource in contention on the node 232a-c, and the node 232a-c utilizes this information to execute a script that identifies candidate containers 240 for removal from the node 232a-c for purposes of balancing use of the identified resource on the node 232a-c. Each node 232a-c may maintain scripts to identify candidate containers 240 for each type of resource contention situation (e.g., CPU contention, memory contention, etc.). The script run by the node identifies the particular usage level of the identified resource by each running container 240 on the node 232a-c, and ranks the containers 240 in terms of the level of usage of the resource. The script executed by the distressed node 232a-c may then randomly select one or more of the top-ranked containers 240, but does not select the highest ranked container 240, to provide as a candidate container 240 for migration to the control server 270. The highest-ranked container 240 (in terms of the particular resource usage) is not selected as migrating this container 240 off of the distressed node 232a-c may not actually balance resource usage in the PaaS system as its transfer may only pass the problem to another node 232a-c causing an unending cycle of container migration in the PaaS system.

After the distressed node 232a-c executes the script to identify candidate container(s) 240, the node 232a-c returns UUID(s) of the identified container(s) 240 to the control server 270. The control server 270 then contacts a PaaS master component 222 with identifying information of the distressed node 232a-c and the UUID(s) of the candidate container(s) 240 on the node 232a-c and requests the PaaS master component 22 to move the candidate container(s) 240.

A migration component 290 of the PaaS master component 222 then invokes a migration process to move the candidate container(s) 240 from the distressed node 232a-c to a destination node 232a-c. The migration component 290 queries nodes 232a-c to identify the best candidate destination node 232a-c for the candidate container(s) 240. For example, the migration component 290 may locate a destination node 232*a-c* having the least number of running containers 240 or the smallest amount of usage of the resource in contention. Once the migration component 290 completes the migration process for the candidate container(s) 240, the PaaS master component 22 informs both of the monitoring server 260 and the control server 270 that the candidate container(s) 240 were migrated from the distressed node 232*a-c.*

Figure 3:
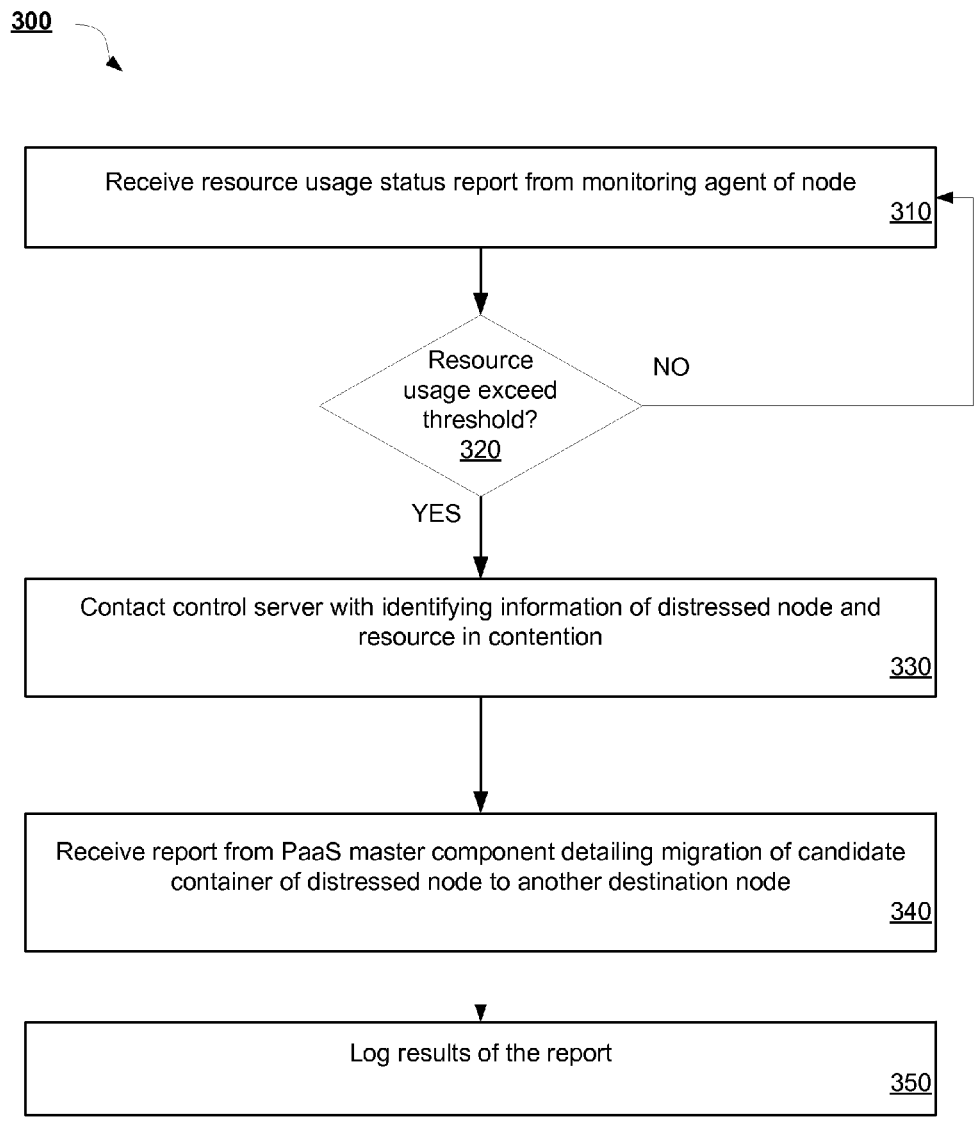
FIG. 3 is a flow diagram illustrating a method for automated container migration by a monitoring server of a multi-tenant PaaS system according to an implementation of the disclosure.

FIG. 3 is a flow diagram illustrating a method 300 for automated container migration by a monitoring server of a multi-tenant PaaS system according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by monitoring server 260 of FIG. 2.

Method 300 begins at block 310 where a resource usage status report is received from a monitoring agent of a node of the multi-tenant PaaS system. The resource usage status report may be related to one or many resources monitored by the monitoring agent on the node. For example, the monitored resources may include CPU utilization, memory utilization, block I/O utilization, network bandwidth, and so on. At decision block 320, it is determined whether the reported resource usage exceeds a threshold level of resource usage configured for the node. If not, then method 300 returns to block 310 to continue receiving resource usage status reports.

On the other hand, if the resource usage exceeds the configured resource usage threshold, the method 300 proceeds to block 330 where the monitoring server contacts a control server with the identifying information of the distressed node and an identification of the resource under contention. Subsequently, at block 340, a report is received from a PaaS master component detailing a migration of candidate container(s) from the distressed node to a destination node. Lastly, at block 350, the results of the report are logged at the monitoring server.

Figure 4:
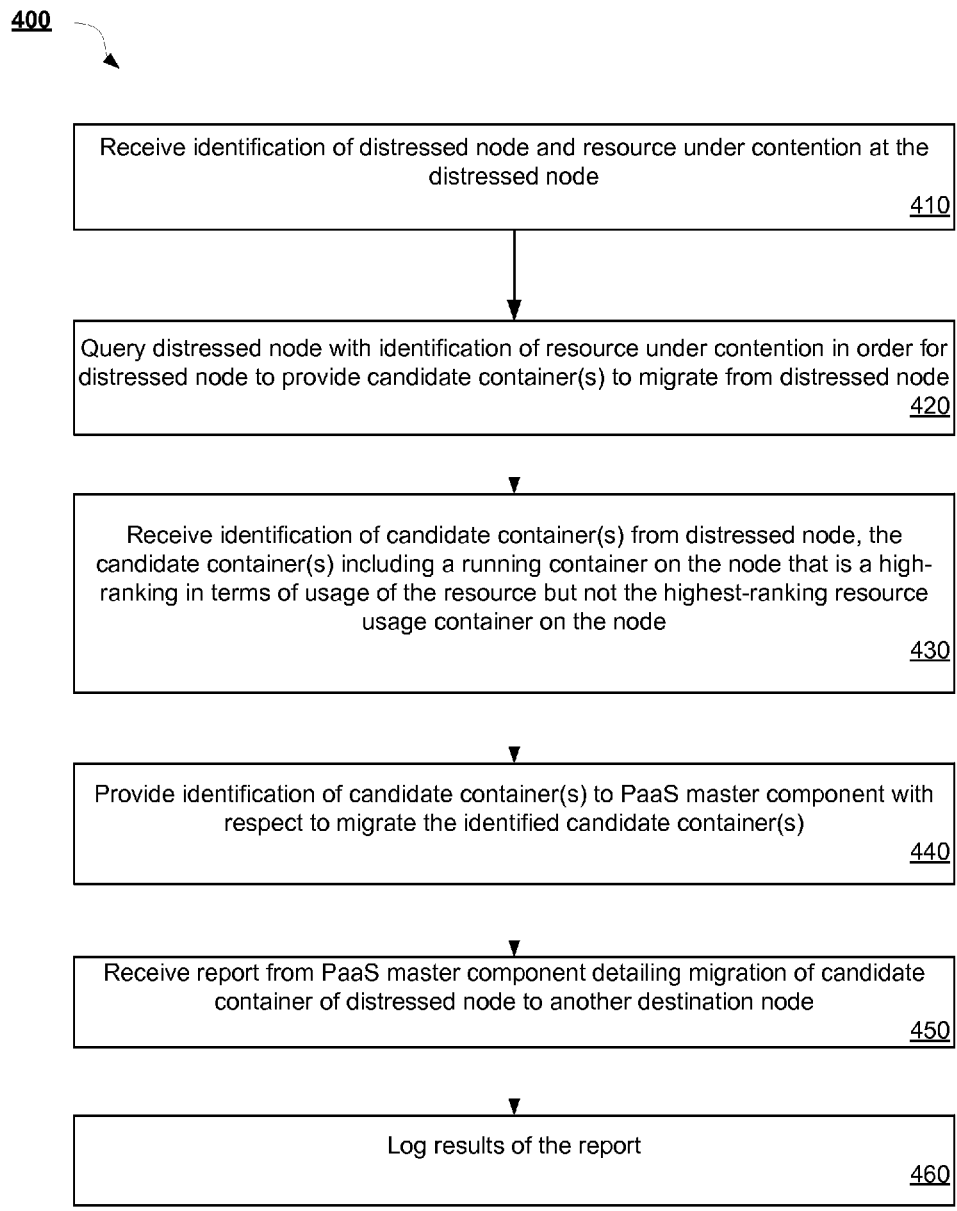
FIG. 4 is a flow diagram illustrating a method for automated container migration by a control server of a multi-tenant PaaS system according to an implementation of the disclosure.

FIG. 4 is a flow diagram illustrating a method 400 for automated container migration by a control server of a multi-tenant PaaS system according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by control server 270 of FIG. 2.

Method 400 begins at block 410 where identification of a distressed node and a resource under contention at the distressed node is received at the control server. In one implementation, the information is received from a monitoring server that monitors resource usage of the nodes in the PaaS system. At block 420, the distressed node is queried with the identification of the resource under contention. The querying invokes execution of a script at the distressed node to identify candidate container(s) to migrate from the distressed node.

At block 430, identification of the candidate container(s) is received from the distressed node. In one implementation, the candidate container(s) include a running container on the node that is high-ranking in terms of usage of the resource under contention but is not the highest ranking container in terms of usage of the resource. Then, at block 440, identification of the candidate container(s) is provided to a PaaS master component along with a request to migrate the candidate container(s) from the distressed node. Subsequently, at block 450, a report is received from the PaaS master component detailing a migration of the candidate container(s) from the distressed node to a destination node. Lastly, at block 460, the results of the report are logged at the control server.

Figure 5:
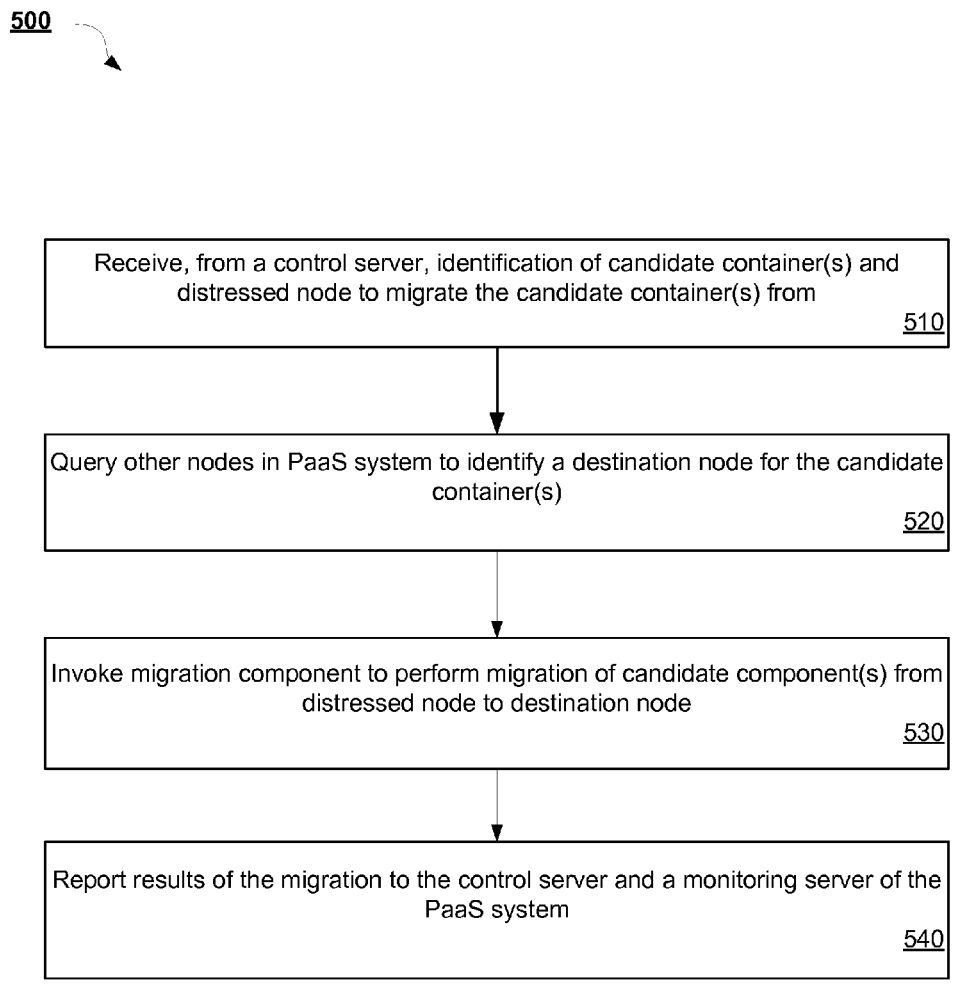
FIG. 5 is a flow diagram illustrating a method for automated container migration by a PaaS master component of a multi-tenant PaaS system according to an implementation of the disclosure.

FIG. 5 is a flow diagram illustrating a method 500 for automated container migration by a PaaS master component of a multi-tenant PaaS system according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by PaaS master component 222 of FIG. 2.

Method 500 begins at block 510 where identification of candidate container(s) and a distressed node is received from a control server. In addition, a request to migrate the candidate container(s) from the distressed node is sent with the identifying information. At block 520, other nodes in the PaaS system are queried in order to identify a destination node for the candidate container(s).

At block 530, a migration component is invoked in order to perform the migration of the candidate container(s) from the distressed node to the destination node. Lastly, at block 450, results of the migration are reported to the control server and a monitoring server of the PaaS system.

Figure 6:
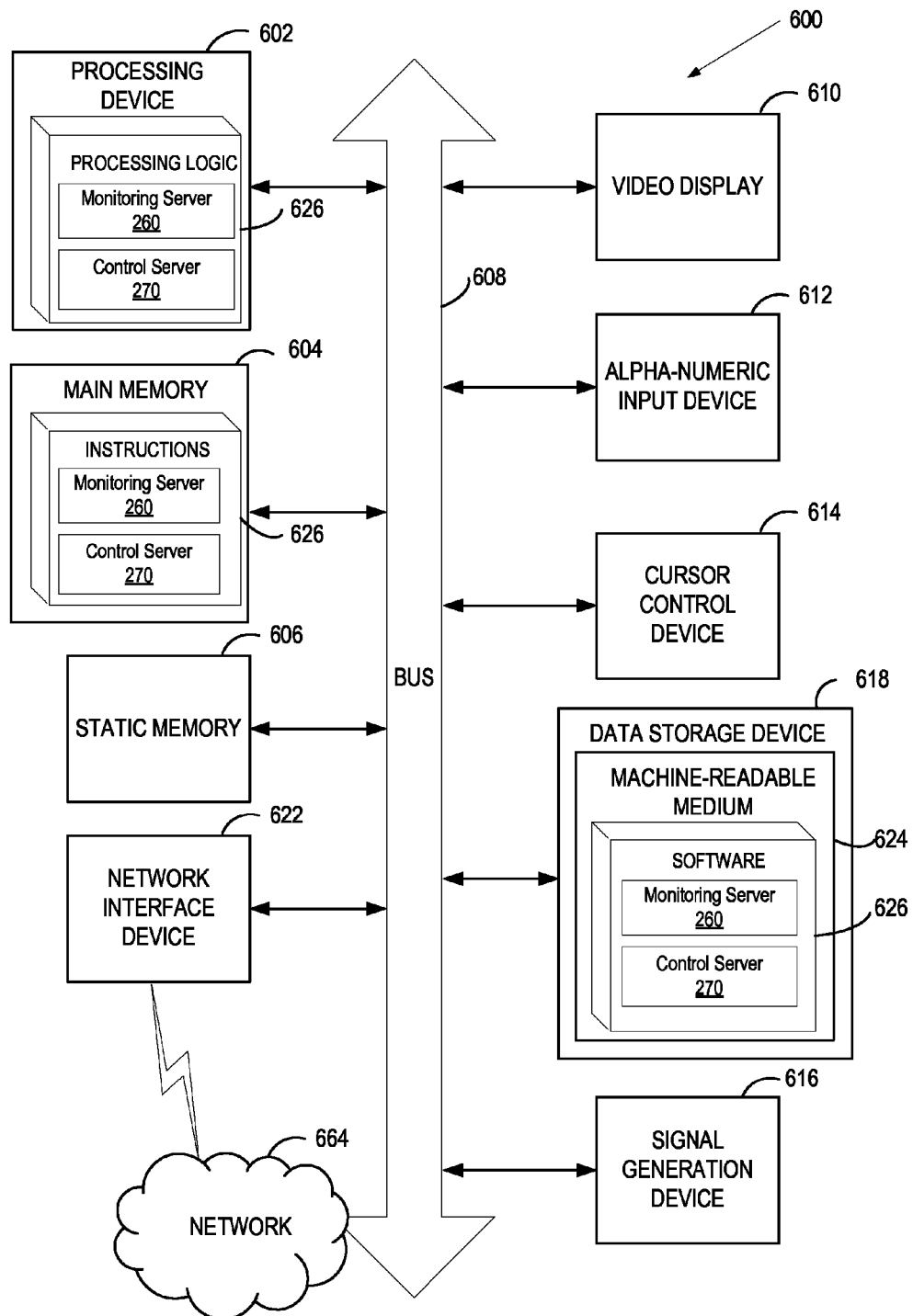
FIG. 6 illustrates a block diagram of one implementation of a computer system.

FIG. 6 illustrates a diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 608.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 622 communicably coupled to a network 664. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement a monitoring server 260 and a control server 270 to provide automated container migration in a PaaS system, such as the PaaS system described with respect to FIG. 1, and/or a software library containing methods that call the above applications. While the machine-accessible storage medium 624 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "providing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure. What is claimed is:

1. A method, comprising:
receiving, by a processing device executing a control server of a multi-tenant Platform-as-a-Service (PaaS)

system, identification of a distressed node of the multi-tenant PaaS system and a resource under contention at the distressed node;
providing identification of the resource under contention to the distressed node;
receiving, by the processing device, identification of a candidate container of a plurality of containers executing on the distressed node, wherein the candidate container:
  contributes to the resource under contention on the distressed node;
  launches from an instance of an application image corresponding to an application of the PaaS system; and
  is selected from among a plurality of containers executing on the distressed node for migration;
transmitting, by the processing device, the identification of the candidate container to a PaaS master component of the PaaS system and a request to migrate the candidate container from the distressed node; and
invoking a migration component to perform migration of the candidate container within the PaaS system in view of the transmitting of the identification and the request.

2. The method of claim 1, wherein the resource under contention comprises at least one of central processing unit (CPU), memory, block input/output (I/O), or network bandwidth.

3. The method of claim 1, wherein in response to receiving the identification of the resource under contention, the distressed node to execute a script to identify the candidate container on the distressed node.

4. The method of claim 3, wherein, among the plurality of containers executing on the distressed node, the candidate container is associated with a top pre-determined percentage usage level of the resource under contention but not a highest usage level of the resource under contention.

5. The method of claim 1, further comprising receiving a report from the PaaS master component detailing results of migrating the candidate container to a destination node of the PaaS system, the destination node different than the distressed node.

6. The method of claim 1, wherein a monitoring server provides the identification of the distressed node and the resource under contention to the control server.

7. The method of claim 6, wherein the monitoring server receives a resource usage status report from a monitoring agent executing on the distressed node, and wherein the monitoring server determines that the resource is under contention based on the resource usage status report providing a resource usage level for the resource that exceeds a resource threshold configured at the monitoring server.

8. The method of claim 1, wherein the distressed node executes multiple applications comprising at least the application, and wherein the multiple applications are owned by different owners.

9. A system, comprising:
a memory;
a processing device communicably coupled to the memory; and
a control server executable from the memory by the processing device, the control server to:
  receive identification of a distressed node of a multi-tenant Platform-as-a-Service (PaaS) system comprising the control server and identification of a resource under contention at the distressed node;
  provide identification of the resource under contention to the distressed node;
  receive, from the distressed node, identification of a candidate container of a plurality of containers executing on the distressed node, wherein the candidate container:
    contributes to the resource under contention on the distressed node;
    launches from an instance of an application image corresponding to an application of the PaaS system; and
    is selected from among a plurality of containers executing on the distressed node for migration;
  transmit the identification of the candidate container to a PaaS master component of the PaaS system and a request to migrate the candidate container from the distressed node; and
  invoke a migration component to perform migration of the candidate container within the PaaS system in view of the transmitting of the identification and the request.

10. The system of claim 9, wherein the resource under contention comprises at least one of central processing unit (CPU), memory, block input/output (I/O), or network bandwidth.

11. The system of claim 9, wherein in response to receiving the identification of the resource under contention, the distressed node to execute a script to identify the candidate container on the distressed node.

12. The system of claim 11, wherein, among the plurality of containers executing on the distressed node, the candidate container is associated with a top pre-determined percentage usage level of the resource under contention but not a highest usage level of the resource under contention.

13. The system of claim 9, wherein the control server further to receive a report from the PaaS master component detailing results of migrating the candidate container to a destination node of the PaaS system, the destination node different than the distressed node.

14. The system of claim 9, wherein a monitoring server provides the identification of the distressed node and the resource under contention to the control server.

15. The system of claim 9, wherein the monitoring server receives a resource usage status report from a monitoring agent executing on the distressed node, and wherein the monitoring server determines that the resource is under contention based on the resource usage status report providing a resource usage level for the resource that exceeds a resource threshold configured at the monitoring server.

16. A non-transitory machine-readable storage medium including instructions that, when accessed by a processing device, cause the processing device to:
receive, by the processing device executing a control server of a multi-tenant Platform-as-a-Service (PaaS) system, identification of a distressed node of the multi-tenant PaaS system and a resource under contention at the distressed node;
provide identification of the resource under contention to the distressed node;
receive, by the processing device from the distressed node, identification of a candidate container of a plurality of containers executing on the distressed node, wherein the candidate container:
  contributes to the resource under contention on the distressed node;
  launches from an instance of an application image corresponding to an application of the PaaS system; and is selected from among a plurality of containers executing on the distressed node for migration;

transmit, by the processing device, the identification of the candidate container to a PaaS master component of the PaaS system and a request to migrate the candidate container from the distressed node; and invoke a migration component to perform migration of the candidate container within the PaaS system in view of the transmitting of the identification and the request.

17. The non-transitory machine-readable storage medium of claim 16, wherein the resource under contention comprises at least one of central processing unit (CPU), memory, block input/output (I/O), or network bandwidth.

18. The non-transitory machine-readable storage medium of claim 16, wherein in response to receiving the identification of the resource under contention, the distressed node to execute a script to identify the candidate container on the distressed node, and wherein, among the plurality of containers executing on the distressed node, the candidate container is associated with a top pre-determined percentage usage level of the resource under contention but not a highest usage level of the resource under contention.

19. The non-transitory machine-readable storage medium of claim 16, wherein the processing device further to receive a report from the PaaS master component detailing results of migrating the candidate container to a destination node of the PaaS system, the destination node different than the distressed node.

20. The non-transitory machine-readable storage medium of claim 16, wherein a monitoring server provides the identification of the distressed node and the resource under contention to the control server, wherein the monitoring server receives a resource usage status report from a monitoring agent executing on the distressed node, and wherein the monitoring server determines that the resource is under contention based on the resource usage status report providing a resource usage level for the resource that exceeds a resource threshold configured at the monitoring server.

\* \* \* \* \*